United States Patent
Kim

(10) Patent No.: US 9,715,071 B1
(45) Date of Patent: Jul. 25, 2017

(54) BENDING TYPE OPTICAL MODULE AND METHOD OF MANUFACTURING THE SAME

(71) Applicant: Yottahn, Inc., Palo Alto, CA (US)

(72) Inventor: Hyogyeom Kim, Osan (KR)

(73) Assignee: Yottahn, Inc., Palo Alto, CA (US)

( * ) Notice: Subject to any disclaimer, the term of this patent is extended or adjusted under 35 U.S.C. 154(b) by 0 days.

(21) Appl. No.: 15/263,126

(22) Filed: Sep. 12, 2016

(51) Int. Cl.
*G02B 6/12* (2006.01)
*G02B 6/42* (2006.01)
*G02B 6/30* (2006.01)
*G02B 6/32* (2006.01)

(52) U.S. Cl.
CPC ............ *G02B 6/4243* (2013.01); *G02B 6/30* (2013.01); *G02B 6/32* (2013.01); *G02B 6/4206* (2013.01); *G02B 6/4224* (2013.01); *G02B 6/4239* (2013.01)

(58) Field of Classification Search
CPC .......... G02B 6/4243; G02B 6/30; G02B 6/32; G02B 6/4206; G02B 6/4224; G02B 6/4239
USPC .......................................................... 385/14
See application file for complete search history.

(56) References Cited

U.S. PATENT DOCUMENTS

| 9,423,569 | B2 | 8/2016 | Son et al. | |
| 2002/0067898 | A1* | 6/2002 | Shaw | G02B 6/4471 385/92 |
| 2012/0251033 | A1* | 10/2012 | Matsuoka | G02B 6/4259 385/8 |
| 2014/0183344 | A1* | 7/2014 | Lee | G02B 6/4214 250/227.24 |

FOREIGN PATENT DOCUMENTS

| KR | 10-1480025 B1 | 1/2015 |
| KR | 10-1502318 B1 | 3/2015 |

* cited by examiner

*Primary Examiner* — Jerry Blevins
(74) *Attorney, Agent, or Firm* — McGuireWoods LLP

(57) ABSTRACT

Provided is a bending type optical module, which includes a substrate and one or more optical devices disposed on the substrate. An integrated circuit (IC) device is disposed on the substrate for driving the one or more optical devices. One or more optical fibers are in optical communications with the one or more optical devices. An optical bench is attached to the substrate and has a first curved surface on a top surface thereof. A cover block is attached to the optical bench and has second curved surface on a bottom surface thereof. The one or more optical fibers extend curved between the first curved surface of the optical bench and the second curved surface of the cover block.

20 Claims, 13 Drawing Sheets

400

BENDING TYPE OPTICAL MODULE AND METHOD OF MANUFACTURING THE SAME

BACKGROUND

1. Field of the Disclosure

The present disclosure relates to a bending type optical module and a method of manufacturing the same.

2. Background of the Disclosure

As various multimedia services have emerged recently, the necessity for exchanging a large amount of data via networks has increased. In particular, since the introduction of the high definition (HD) and ultra-high definition (UHD) television services, conventional copper wire-based data transmission has reached its transmission capacity limit, and optical fiber-based signal transmission has become main stream in real life. Optical fibers, which are not subject to electromagnetic interference and enable broadband transmission, are being widely used in large-capacity transmission of digital media data including, for example, HD and UHD digital video broadcasting and streaming services.

An optical module may operate as a data receiving device that converts optical signals received via optical fibers into electrical signals, or operate as a data transmitting device that converts electrical signals into optical signals and transmits the optical signals via optical fibers. A slight misalignment among the components in optical modules can lead to a loss of optical signals during transmitting or receiving operations. Accordingly, there is a need for an optical module that is constructed and manufactured to ensure proper alignment among the components.

SUMMARY OF THE DISCLOSURE

Accordingly, the present disclosure provides a bending type optical module and a method of manufacturing thereof, which ensure proper alignment among the components thereof.

According to an aspect of the present disclosure, there is provided a bending type optical module, which includes a substrate; one or more optical devices disposed on the substrate; an integrated circuit (IC) device disposed on the substrate for driving the one or more optical devices; one or more optical fibers in optical communications with the one or more optical devices; an optical bench attached to the substrate and having a first curved surface on a top surface thereof; and a cover attached to the optical bench and having a second curved surface on a bottom surface thereof. The one or more optical fibers may extend curved between the first curved surface of the optical bench and the second curved surface of the cover.

The optical bench may be block-shaped, and the cover may be block-shaped, U-shaped, or L-shaped.

The optical bench may include a seating groove, into which the one or more optical fibers may be inserted and seated; a lens unit including one or more lenses provided corresponding to the one or more optical fibers, respectively; and a first bend part that may extend between the seating groove and the lens unit to form the first curved surface of the optical bench.

The cover may include a hold part formed on the bottom surface of the cover and protruding corresponding to the seating groove of the optical bench; and a second bend part that may extend from the hold part and curved corresponding to the first bend part to form the second curved surface.

The one or more optical fibers may be bent along a gap between the first curved surface and the second curved surface.

The cover may further include an injection port formed through the hold part and extending to the gap between the first curved surface and the second curved surface.

The bending type optical module may further include one or more reference marks formed on the substrate for alignment with the optical bench.

The hold part of the cover may include one or more shaped grooves formed corresponding to the one or more optical fibers, respectively. The shaped grooves may have a triangular shape or "V" shape (e.g., ∧-shaped), a semi-circular or "U" shape (e.g., ∩-shaped).

A radius of a curvature of the first bend part may be equal to or greater than a minimum bend radius of each of the one or more of the optical fibers.

A radius of a curvature of the second bend part may be equal to or greater than that of the first bend part.

The first bend part may include a rectilinear region having a length of about 0.5 mm or more and adjoining the lens unit.

The second bend part may include a rectilinear region having a length of about 0.5 mm or more and adjoining the lens unit.

The cover may further include one or more hook-shaped fastening ports. The optical bench may include one or more fastening grooves formed to engage the one or more fastening ports.

The gap between the first curved surface and the second curved surface may be tapered from one end portion adjoining the lens unit to the other end adjoining the seating groove of the optical bench.

The one or more optical fibers may have cut surfaces that are tilted from a plane perpendicular to a lengthwise direction of the one or more optical fibers.

The cut surfaces of the optical fibers may be in full contact with the one or more lenses of the lens unit, respectively.

According to another aspect of the present disclosure, a method of manufacturing a bending type optical module is provided. A substrate having a top surface is provided, on which wiring may be printed at positions where one or more optical devices and an integrated circuit (IC) device are to be disposed and one or more reference marks for alignment of the optical bench are formed. The one or more optical devices and the IC device may be mounted on the wiring. An optical bench may be aligned and mounted on the substrate based on the one or more reference marks. The optical bench may include a seating groove and a first bend part extending curved from the seating groove towards the one or more optical devices. A cover may be coupled to the optical bench. The cover may include a hold part and a second bend part curved corresponding to the first pend part. One or more optical fibers may be inserted into a gap extending between the seating groove and the hold part and between the first bend part and the second bend part. An adhesive may be injected and hardened.

The adhesive may be injected via an injection port formed on the cover.

The method may further include adjusting an optical path of each of the one or more optical fibers prior to injecting the adhesive.

The adjusting optical path may include inclining the one or more optical fibers to form full contact between cut surfaces of the one or more optical fibers and the one or more optical devices, respectively.

The cut surfaces of the one or more optical fibers may be tilted from a plane perpendicular to a lengthwise direction of the one or more optical fibers.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
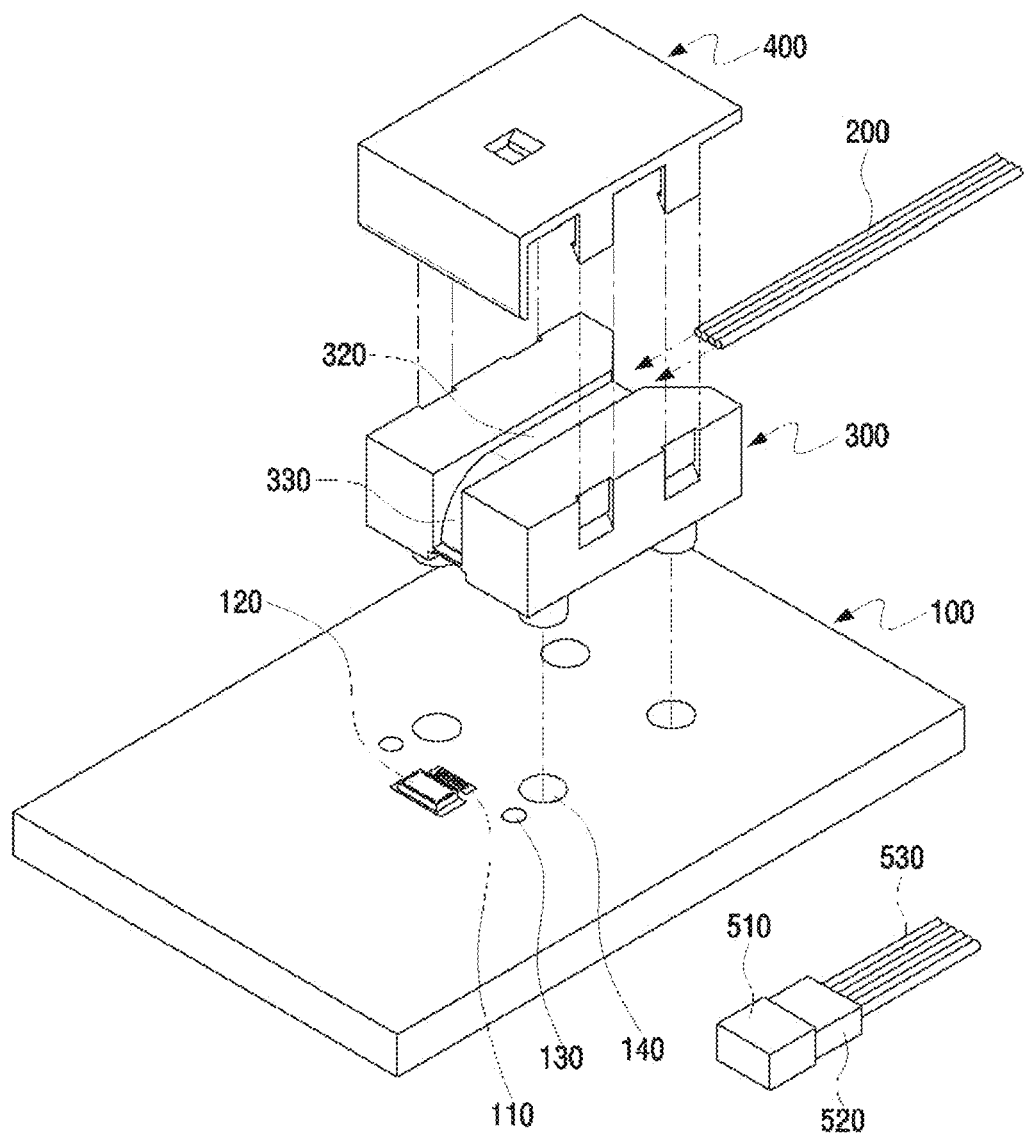
FIG. 1 is an exploded perspective view of an example of an optical module constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 is an exploded perspective view of an example of an optical module, constructed according to the principles of the present disclosure.

As illustrated in FIG. 1, the optical module may include, for example, a substrate 100, one or more optical devices 110, one or more optical fibers 200, an optical bench 300, a cover 400, and/or the like. The optical devices 110 may be disposed on (and/or in) the substrate TOO. The optical fibers 200 may be in optical communications with the optical devices 110, and the optical fibers 200 may be connected to the optical bench 300. The optical bench 300 may accommodate the optical communications between the optical devices 110 and the optical fibers 200. The cover 400 may cover the optical bench 300.

The optical fibers 200 may be formed of, for example, glass optical fibers, polymer optical fibers, or the like. The polymer optical fibers may be easily connectable and usable such that installation cost may be reduced. The polymer optical fibers may be used in short range applications, such as, for example, network applications that may be, for example, equal to or less than about 100 m. The polymer optical fibers may be more flexible compared to glass optical fibers and thus may be able to sustain a tighter bend radius. The tighter bend radius may render it easier install wiring in residential houses and office buildings. The optical fibers 200 may be a hybrid cable including, for example, optical fibers and a coaxial cable combined with each other. The hybrid cable may be for an optical/power combination, optical/local area network (LAN) combination (e.g., unscreened twisted pairs/foil screened twisted pairs (UTP/FTP)), or the like.

As illustrated, the substrate 100 may include, for example, on the top surface of the substrate 100, the optical devices 110, an integrated circuit (IC) device 120 for driving the optical devices 110, and reference marks 130 for aligning and/or arranging elements to be connected thereto. The substrate 100 may be a printed circuit board (PCB), for example. Wiring for coupling the optical devices 110 to the IC device 120 and the reference marks 130 may be printed on (and/or in) the substrate 100 at production. Leg insertion holes 140, into which legs 360 (shown in FIG. 2) for fixing the optical bench 300 are inserted, may be formed in the substrate 100. The optical devices 110 may be light-emitting devices when the optical module is an optical transmitter. The optical devices 110 may be photodetectors when the optical module is an optical receiver. Laser diodes may be used as the light-emitting devices, and photodiodes may be used as the photodetectors. One or more optical devices may be used as the optical devices 110 depending on the number of the optical fibers 200.

A ribbon-slot-shaped optical fiber may be formed by, for example, coupling four optical fibers 200. When a ribbon-slot-shaped optical fiber is employed, the four optical devices 110 may be disposed separated by a distance corresponding to the separation between the optical fiber cores.

The IC device 120 may be a circuit for driving the optical devices 110. Signals may be applied to the IC device 120 so that the optical devices 110 may emit light according to the electrical signals input to the optical devices 110, or the IC device 120 may output detected optical signals as electrical signals.

Referring to FIG. 1, when a hybrid cable that includes, for example, a copper wire, is to be coupled to one or more of the optical fibers 200, a receptacle 510 may be installed on the bottom surface of the substrate 100. The receptacle 510 may be configured to receive and hold a connector 520 to which a copper cable 530 may connected or integrally formed.

The reference marks 130 may be provided on the substrate 100 and serve as reference points, at which the optical bench 300 may be accurately disposed so that the optical devices 110 and the optical fibers 200 are not misaligned. Positioning of the optical devices 110 and an optical unit 320 of the optical bench 300 may need to be accurate for efficient light transmission between the optical devices 110 and the optical fibers 200. Thus, the optical bench 300 and the substrate 100 may need to be coupled to each other at precisely correct positions. When elements are disposed on the PCB substrate 100 using, for example, pick-and-place equipment (not shown) or the like, the elements may be disposed at the correct positions by checking the reference marks 130. At least one, and preferably two or more reference marks 130 may be formed on the substrate 100. The reference marks 130 may be disposed on the same axis as that of the optical devices 110 with the optical devices 110 disposed between the reference marks 130. The reference marks 130 on the substrate 100 may be formed simultaneously with the formation of the wiring pattern for the optical devices 110 and the IC device 120. Fiducial marks may be used as the reference marks 130, for example. The reference marks 130 may be formed with a precision of about 50 μm in the case of a glass epoxy PCB, or may be formed with a precision of about 10 μm in the case of a ceramic PCB. The reference marks 130 for the optical bench 300 may be formed with a precision of submicron by a metal deposition process using a mask (not shown), for example.

Figure 2:
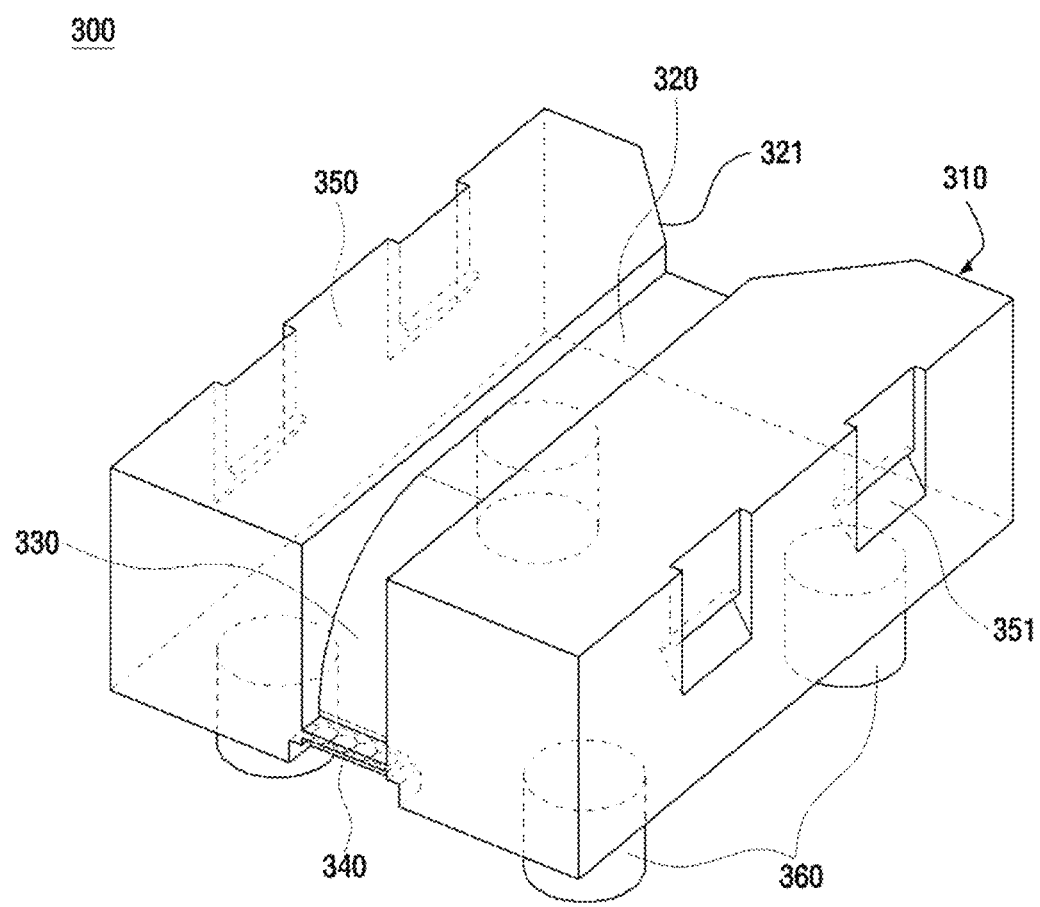
FIG. 2 is a see-through perspective view of an optical bench of the optical module of FIG. 1.
Figure 3:
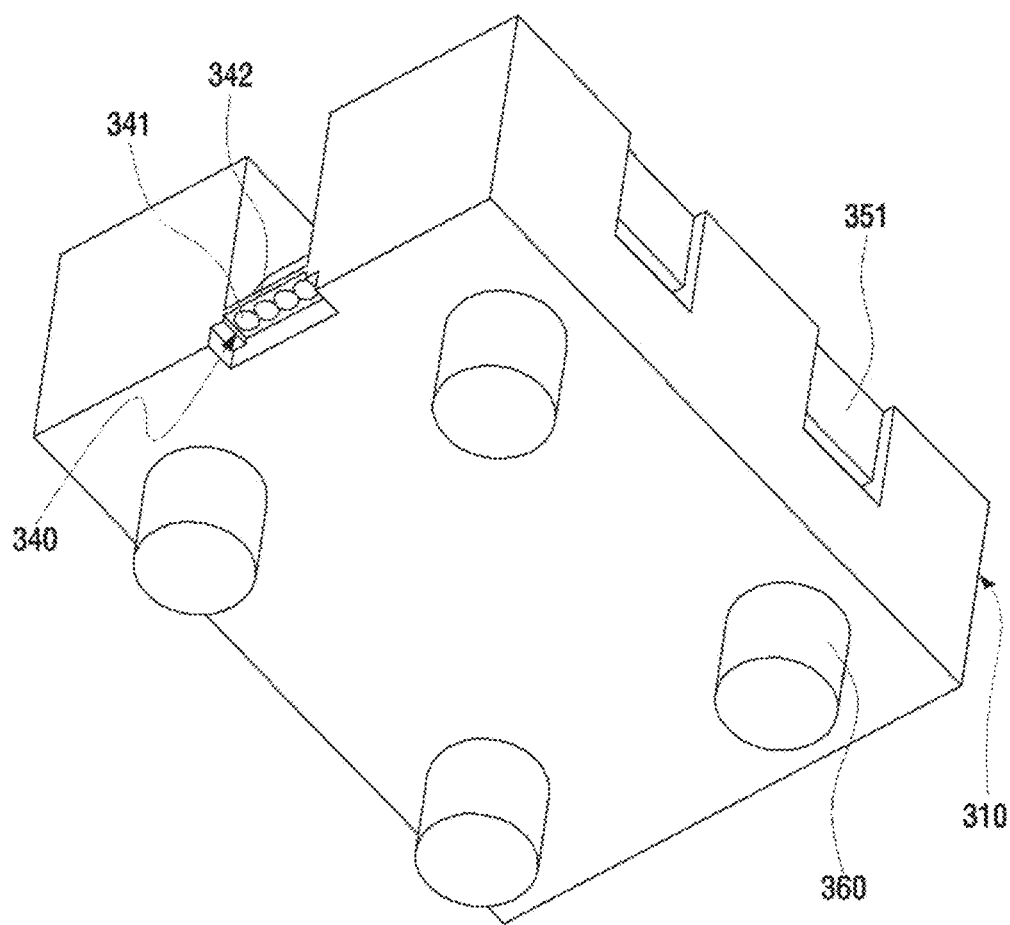
FIG. 3 is a bottom perspective view of the optical bench of the optical module of FIG. 1.

FIG. 2 is a see-through perspective view of an example of the optical bench 300 according to the principles of the present disclosure; and, FIG. 3 is a bottom perspective view of the optical bench 300.

Figure 4:
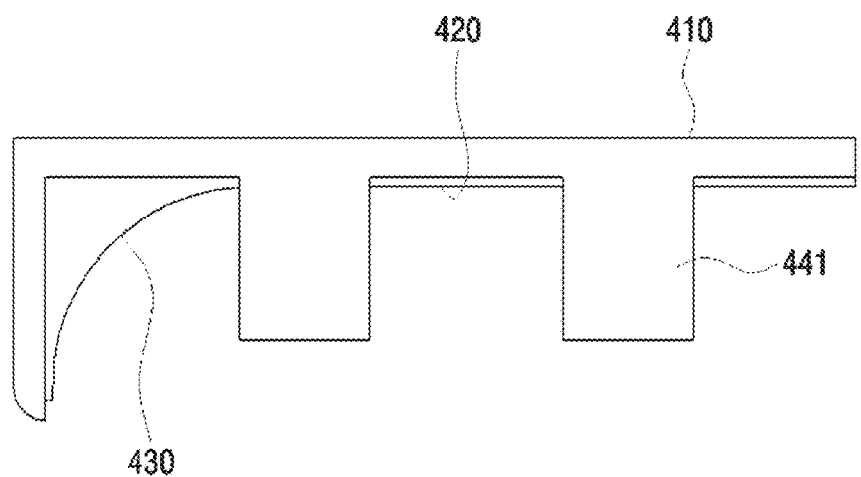
FIG. 4 is a side view of a cover of the optical module of FIG. 1.
Figure 5:
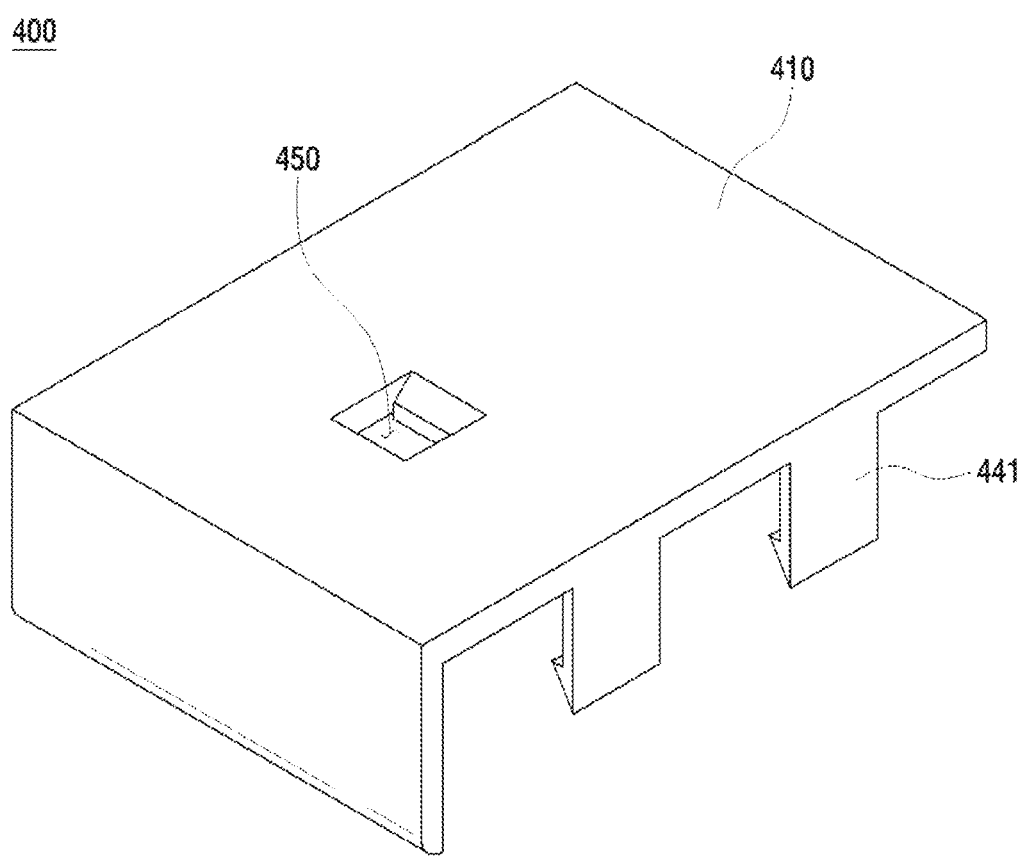
FIG. 5 is a perspective view of the cover of the optical module of FIG. 1.
Figure 6:
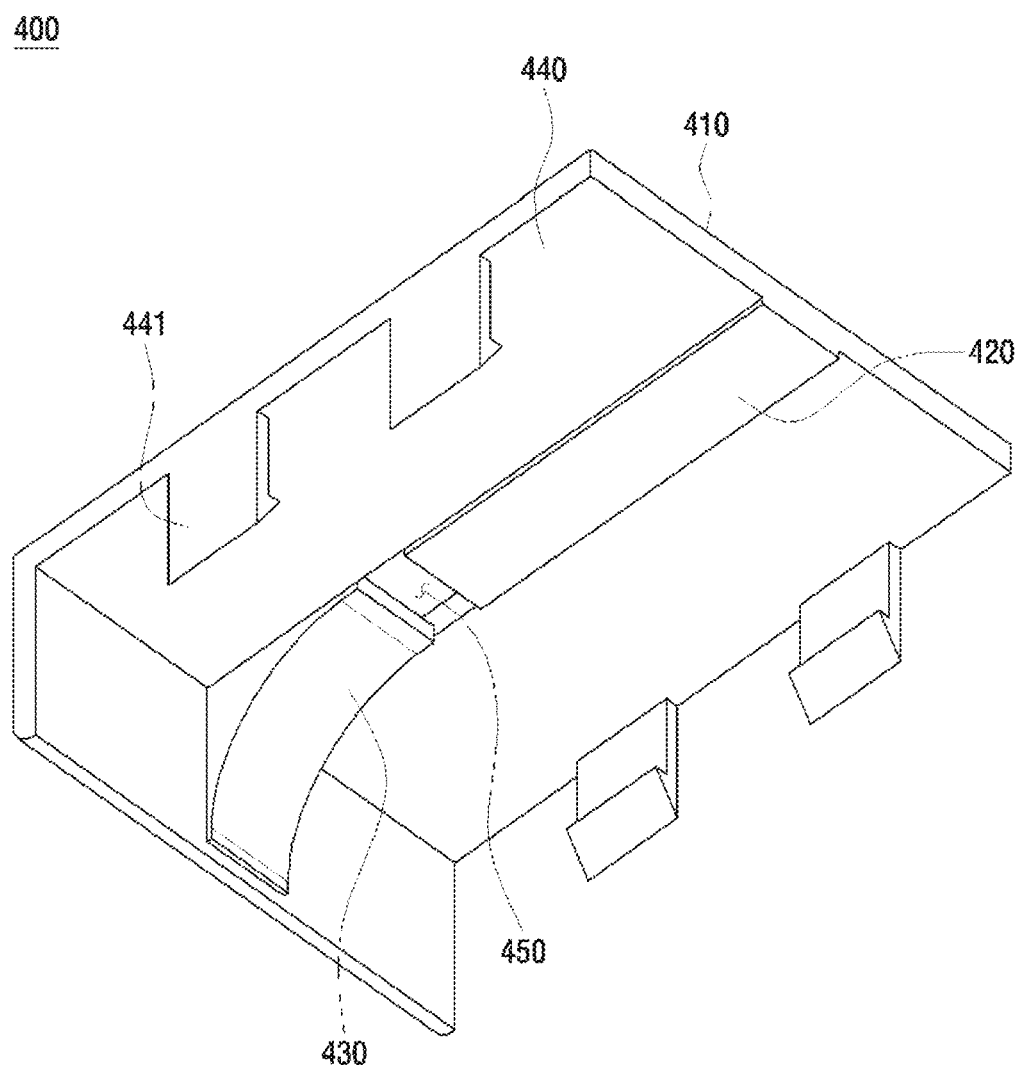
FIG. 6 is a bottom perspective view of the cover of the optical module of FIG. 1.

FIG. 4 is a side view of an example of the cover 400 according to the principles of the present disclosure; FIG. 5 is a perspective view of the cover 400; and, FIG. 6 is a bottom perspective view of the cover 400.

Figure 7:
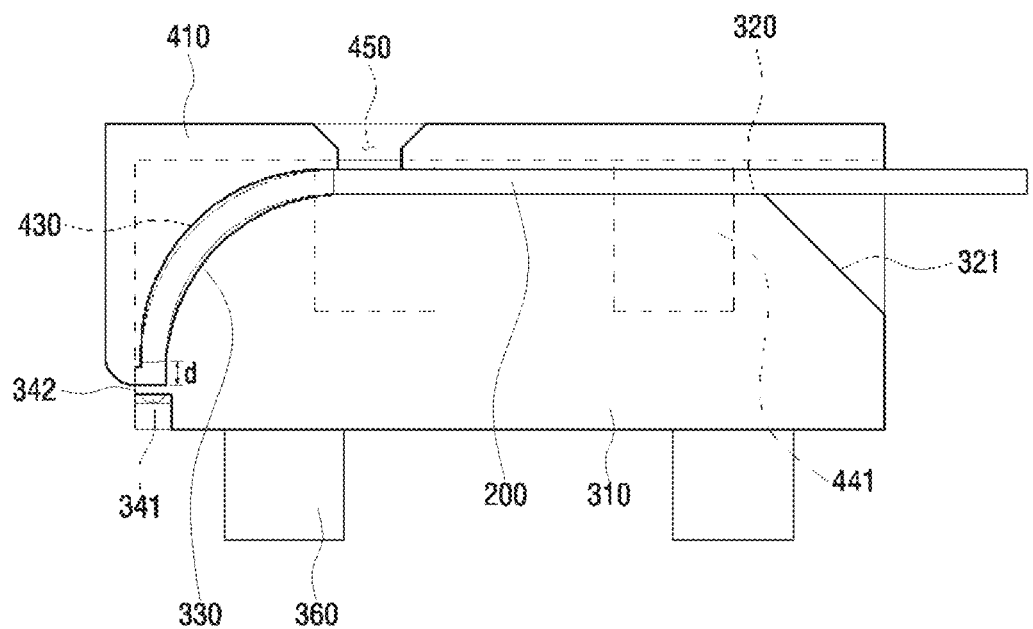
FIG. 7 is a side cross-sectional view of the optical bench and the cover of FIG. 1 being connected to each other.
Figure 8:
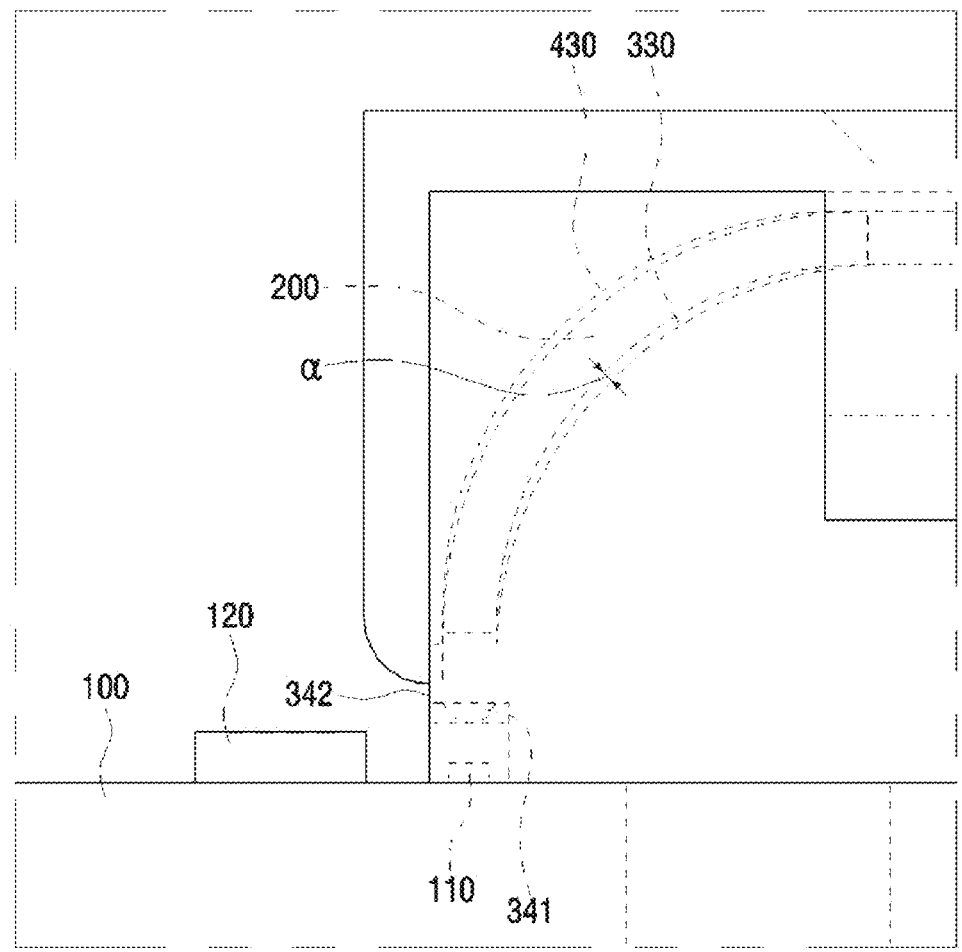
FIG. 8 is a partial side cross-sectional view of the optical bench and the cover of FIG. 1 being connected to each other.

FIGS. 7 and 8 illustrate the optical bench 300, attached to the substrate 100, and the cover 400 coupled to each other, with the optical fibers 200 inserted into the optical bench 300.

Referring to FIGS. 2 and 3, the optical bench 300 may include a bench body 310, a lens unit 340 that concentrates light between the optical devices 110 and the optical fibers 200, a seating groove 320 on which the optical fibers 200 are seated, a first bend part 330 that forms a curved surface in a downward direction from the seating groove 320, sidewall parts 350 formed at opposing (e.g., right acrd left) sides of the seating groove 320, and legs 360 that may be used for attaching the optical bench 300 to the substrate 100. The seating groove 320, in which the optical fibers 200 are seated, may be formed in a region central with respect to the lengthwise direction of the bench body 310. The bench body 310 may have a block shape, for example.

The width of the seating groove 320 may be set to correspond to the aggregate width of the optical fibers 200 to be inserted therein. For example, when the ribbon slot-shaped optical fiber obtained by bundling four optical fibers 200 in parallel is used, the width of the seating groove 320 may be obtained by multiplying the diameter of each of the optical fibers 200 by 4 and adding a margin thereto. A proper margin may be selected in such a way that the optical fibers 200 may be inserted into the seating groove 320 and may not move easily after being seated. The depth of the seating groove 320 may be larger than the diameter of the optical fibers 200. The depth of the seating groove 320 may be, alternatively, less than or substantially equal to the diameter of the optical fibers 200.

An insertion port 321, into which the optical fibers 200 may be inserted, may be formed to have tapered sides. The sidewall parts 350 that form wall surfaces of the seating groove 320 may be formed, for example, on opposing (e.g., at right and left) sides of the seating groove 320. One or more fastening grooves 351, with which the cover 400 may be fixed, may be formed on one or more side outer surfaces of the sidewall parts 350. The lens unit 340 may be formed, for example, at a position where ends of the optical fibers 200 are located after the inserted optical fibers 200 are bent. The lens unit 340 may include, for example, a lens base 342 (shown in FIG. 3) that protrudes from an end of the first bend part 330 horizontally with respect to the substrate 100, and one or more lenses 341 formed on a bottom surface of the lens base 342 to correspond to one or more optical fibers 200 at positions where ends of one or more lenses 341 face the optical devices 110. The lens unit 340 may be spaced apart from the optical devices 110 with a gap therebetween that may ensure the highest light-receiving efficiency. Convex lenses may be used as lenses that constitute the lens unit 340, for concentrating.

The first bend part 330 may connect ends of the seating groove 320 and the lens unit 340 in the form of a curved surface so that the optical fibers 200 may be bent to be in optical communications with the optical devices 110, using the lens unit 340 formed on the bottom surface of the lower bench body 310. The curved surface of the first bend part 330 may have a bend radius corresponding to a minimum bend radius of the optical fibers 200. The minimum bend radius of the optical fibers 200 may depend on, for example, a type of the optical fibers, a diameter of the optical fibers, and/or the like. Because polymer optical fibers may have a Young's modulus value that is about 30 times smaller than glass optical fibers, the minimum bend radius of the polymer optical fibers may be much smaller than the glass optical fibers for the same diameter. The minimum bend radius may be linearly proportional to the overall diameter of the optical fibers. The first bend part 330 may be formed with the same or greater curvature as the minimum bend radius of the optical fibers 200.

Figure 15:
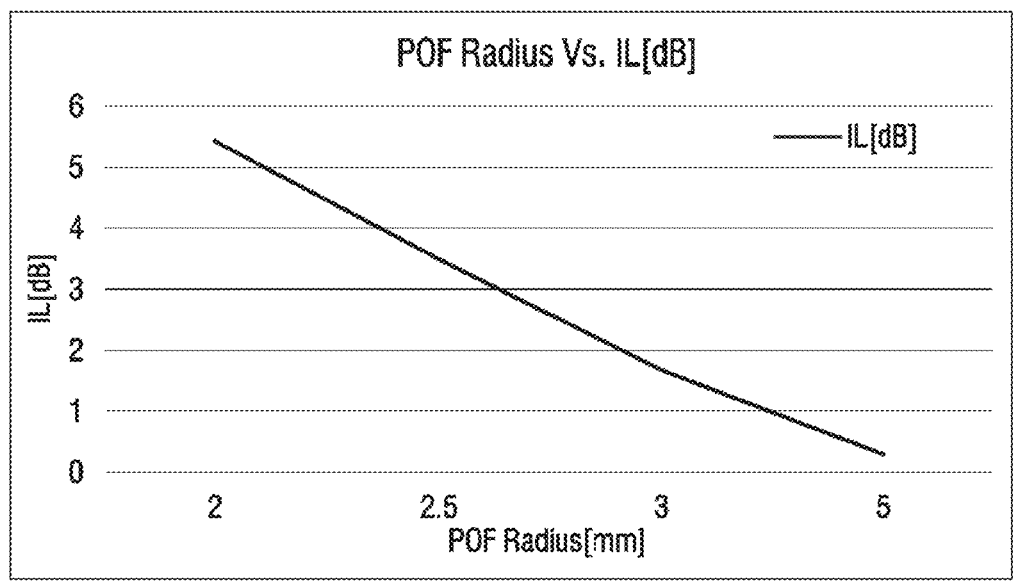
FIG. 15 is a graph showing a loss of light caused by bending of polymer optical fibers versus a bend radius of each of the polymer optical fibers.

FIG. 15 is a graph showing the loss of light caused by bending of polymer optical fibers versus the bend radius of each of the polymer optical fibers. As illustrated, in the case of polymer optical fibers, each having a diameter of 400 μm, a loss of light of 3.5 dB or higher occurs at a bend radius of 2.5 mm or less. When the first bend part 330 is formed with a radius of 3 mm or more, optical fibers, each having a bend radius of approximately 2.8 mm or more, may be inserted. Thus, the optical path can be changed by, for example, about 90 degrees through the optical fibers with a loss of light that is smaller than the loss of light that occurs in a reflector or prism that changes optical path.

As illustrated in FIG. 7, the first bend part 330 may include a rectilinear section d at a position where the first bend part 330 is connected to the lens unit 340. The rectilinear section d may be set to be, for example, about 0.5 mm or longer. Due to the rectilinear section d, cut surfaces of the optical fibers 200 may contact the lens base 342 of the lens unit 340 in the horizontal direction.

Meanwhile, the legs 360 may be used for attaching the optical bench 300 to the substrate 100. The legs 360 may be formed in the form of, for example, pillars, pins, rods, or the like, on a bottom surface of the optical bench 300 at positions corresponding to the positions of the leg insertion holes 140. By inserting the legs 360 into the leg insertion holes 140, the optical bench 300 may be attached to the substrate 100 more precisely at a position suitable for optical coupling.

As illustrated in FIGS. 4, 5 and 6, the cover 400 includes a cover body 410. The cover body 410 may have a block shape, a "U" shape, an "L" shape, or any other shape that may correspond to and through which the cover 400 may be coupled to the top surface of the optical bench 300. The cover body 410 may include a hold part (or retainer) 420 that may hold the optical fibers 200 by having a bottom surface of the body 410 protruding at a position corresponding to the seating groove 320 of the optical bench 300, an injection port 450 (shown in FIG. 5) through which an adhesive may be injected, the second bend part 430 that extends from the hold part 420 and is formed as a curved surface corresponding to the first bend part 330 to hold the optical fibers 200 bent along the curved surface of the first bend part 330, and side bottom parts 440 (shown in FIG. 6) formed at opposing (e.g., right and left) sides of the hold part 420.

The hold part 420 may be formed to have the same width as that of the seating groove 320 to be disposed in the seating groove 320. Although not shown, the hold part 420 may include a plurality of grooves whose number may correspond to the number of the optical fibers 200 in the lengthwise directions of the optical fibers 200. The grooves may have a triangular shape, a "V" shape (e.g., ∧-shape), a semi-circular shape, a "U" shape (e.g., ∩-shaped), or the like. The height of a bottom surface of the hold part 420 may be set in such a way that the optical fibers 200 may be each held in the plurality of grooves.

As shown in FIG. 6, the bottom surface of the hold part 420 may be lower than the bottom surface of each of the side bottom parts 440 so that the hold part 420 may be inserted and fitted in the seating groove 320 and between the sidewall parts 350 of the optical bench 300.

As shown in FIG. 5, the injection port 450 may be formed extending from and through the top surface of the cover body 410 and through the hold part 420. The injection port 450 may be formed to have the same width as that of the hold part 420. An adhesive, such as, for example, epoxy or the like, may be injected through the injection port 450 so that the optical fibers 200 inserted in a space between the seating groove 320 and the hold part 420 may be fixed to the optical bench 300 and cover 400 and may not move. The injected adhesive may move between and about the optical fibers 200, and between and about the optical fibers 200 and the hold part 420 due to the capillary action. An inlet of the injection port 450 may be formed to be tapered at a lower portion.

The cover body 410 may include fastening ports 441 that may extend from ends of sides of the body 410. The fastening ports 441 may be formed at positions corresponding to the fastening grooves 351 of the optical bench 300 so that a coupling between the cover 400 and the optical bench 300 can be reinforced. The fastening ports 441 may be formed in the form of, for example, hooks or the like.

The second bend part 430 may extend from an end of the hold part 420 and may be configured as a curved surface having a shape corresponding to the first bend part 330. The first bend part 330 and the second bend part 430 may be set to have a gap therebetween, in which the optical fibers 200 are inserted into (shown in FIG. 7). The second bend part 430 may be formed with the same or greater curvature as that of the first bend part 330. When the optical fibers 200 are polymer optical fibers each having a diameter of, for example, about 400 µm, a bend radius of the second bend part may be equal to or greater than about 3.5 mm.

As illustrated in FIG. 7, similar to the rectilinear section d of the first bend part 330, the second bend part 430 may include a rectilinear region at a bottom end thereof so that the optical fibers 200 may be maintained in a rectilinear form up to the set height in the rectilinear region. Due to the rectilinear region, the cut (or end) surfaces of the optical fibers 200 may contact the lens base 342 of the lens unit 340 in the horizontal direction together with the rectilinear section d.

Figure 9:
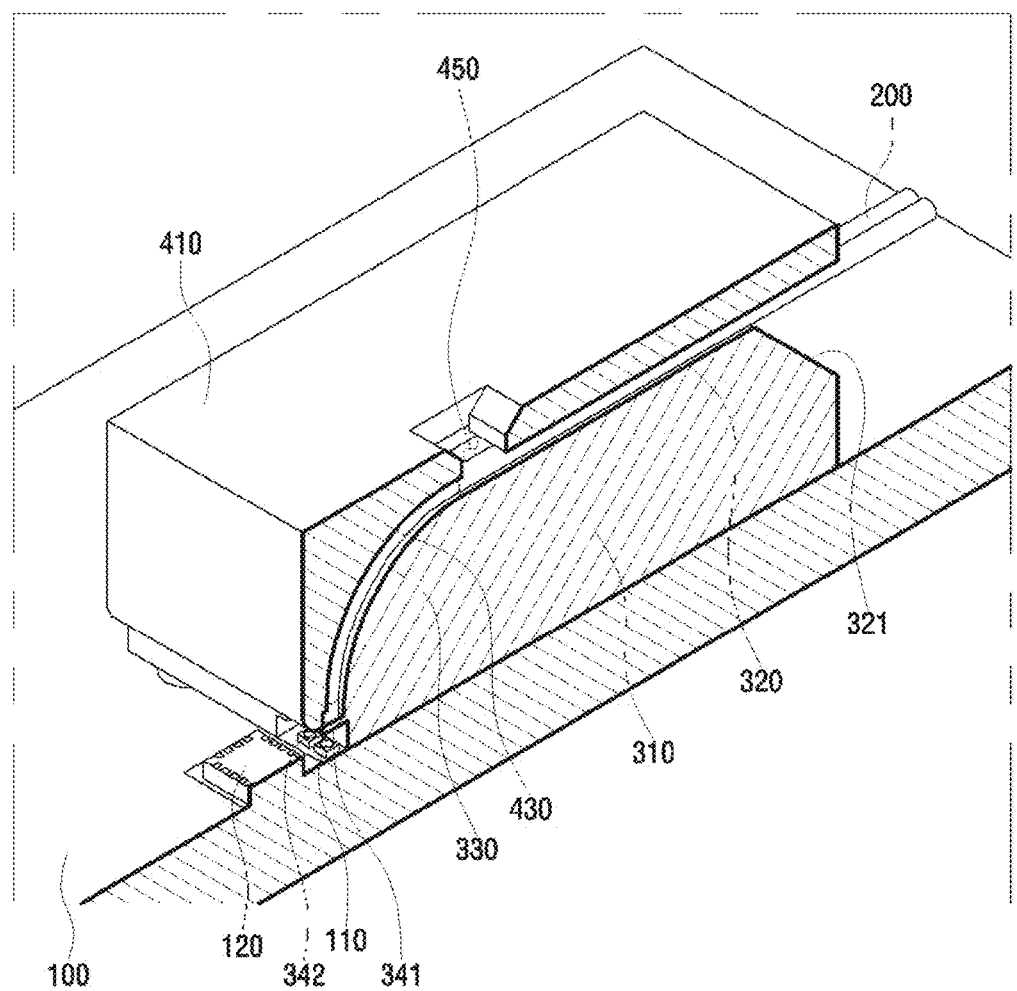
FIG. 9 is a cross-sectional view illustrating a coupling state of the optical module of FIG. 1.

FIG. 9 is a cross-sectional view illustrating a coupling state of the optical module of FIG. A method of manufacturing an optical module according to the principles of the present disclosure will be described with reference to FIG. 9.

Initially, wiring may be printed on (and/or in) the substrate (or PCB) 100 at positions where the optical devices 110 and the IC device 120 are to be disposed. One or more, and preferably two or more reference marks 130 may be printed together with the wiring at this point. The optical devices 110 and the IC device 120 may be coupled to the wiring based on the reference marks 130 using, for example, pick-and-place equipment (not shown) or the like.

Next, the optical bench 300 may be disposed based on the reference marks 130 using, for example, a pick-and-place device, or the like. The legs 360 of the optical bench 300 may be aligned and inserted into the leg insertion holes 140. In order to increase a fixing force, the legs 360 may be inserted into and coupled to the leg insertion holes 140 after the legs 360 are coated with an adhesive. Alignment of the optical bench 300 may be performed based on the reference marks 130. This may dramatically improve the alignment accuracy compared to alignment performed only by coupling the leg insertion holes 140 and the legs 360 because an alignment error due to tolerance errors may be prevented when the leg insertion holes 140 are formed in the substrate 100.

Next, the cover 400 may be coupled to the optical bench 300. The fastening ports 441 may be inserted into the fastening grooves 351 so that the fixing force is increased. When a hook structure is employed, one-touch coupling may be possible. When the legs 360 of the optical bench 300 are inserted into the leg insertion holes 140 of the substrate 100 and alignment of the optical bench 300 is performed based on the reference marks 300, the optical devices 110 may be disposed to face the lenses 341 of the optical bench 300.

Next, the optical fibers 200 may be inserted into a space between the seating grooves 320 and the hold part 420. When the optical fibers 200 are inserted into a space between the hold part 420 and the seating groove 320, the optical fibers 200 may be bent along the curved surfaces of the first bend part 330 and the second bend part 430, and cut (or end) surfaces of the optical fibers 200 may contact the lens base 342 of the lens unit 340. As illustrated in FIG. 7, due to the rectilinear section d of the first bend part 330 and the second bend part 430, the cut surfaces of the optical fibers 200 contact the lens base 342 perpendicular to the lengthwise direction of the optical fibers 200 so that the cut surfaces of the optical fibers 200 may make parallel contacts with the lens base 342. This may reduce a loss of light. As illustrated in FIG. 8, due to a margin α, the optical fibers 200 inserted into the space between the first bend part 330 and the second bend part 430, each may have a radius smaller than the radii of the curved surfaces of the first bend part 330 and the second bend part 430. When the margin is set to be equal to or less than 20 μm and the first bend part 330 and the second bend part 430 are set to be equal to or greater than the minimum bend radius of the optical fibers 200, the optical fibers 200 each may have a bend radius that is equal to or greater than the minimum bend radius plus the margin.

After the cut surfaces of the cal fibers 200 are fixed to contact the lens base 342 using, for example, a jig, or the like, an adhesive may be injected through the injection port 450. When the adhesive is hardened, the optical fibers 200 may be fixed between the hold part 420 and the seating groove 320. After adjusting the optical path of the optical fibers 200, the process of taking the optical fibers 200 out of the seating groove 320 and coating the optical fibers 200 with the adhesive may be omitted. This may contribute to simplifying the manufacturing process and reducing the manufacturing cost.

Meanwhile, the receptacle 510 for an optical cable may be installed on a bottom surface of the substrate 100. When the optical fibers 200 and the copper cable 530 are bundled together as a hybrid cable, the copper cable 530 may be coupled to the receptacle 510. The arrangement position of the receptacle 510 is not limited to the bottom surface of the substrate 100, but may be positioned elsewhere, such as, for example, on the top surface of the substrate, or the like. The receptacle 510 for the copper cable 530 may be provided, which may eliminate a process of soldering the copper cable 530 directly onto the substrate 100, thereby shortening the assembly time and reducing the manufacturing cost.

Figure 10:
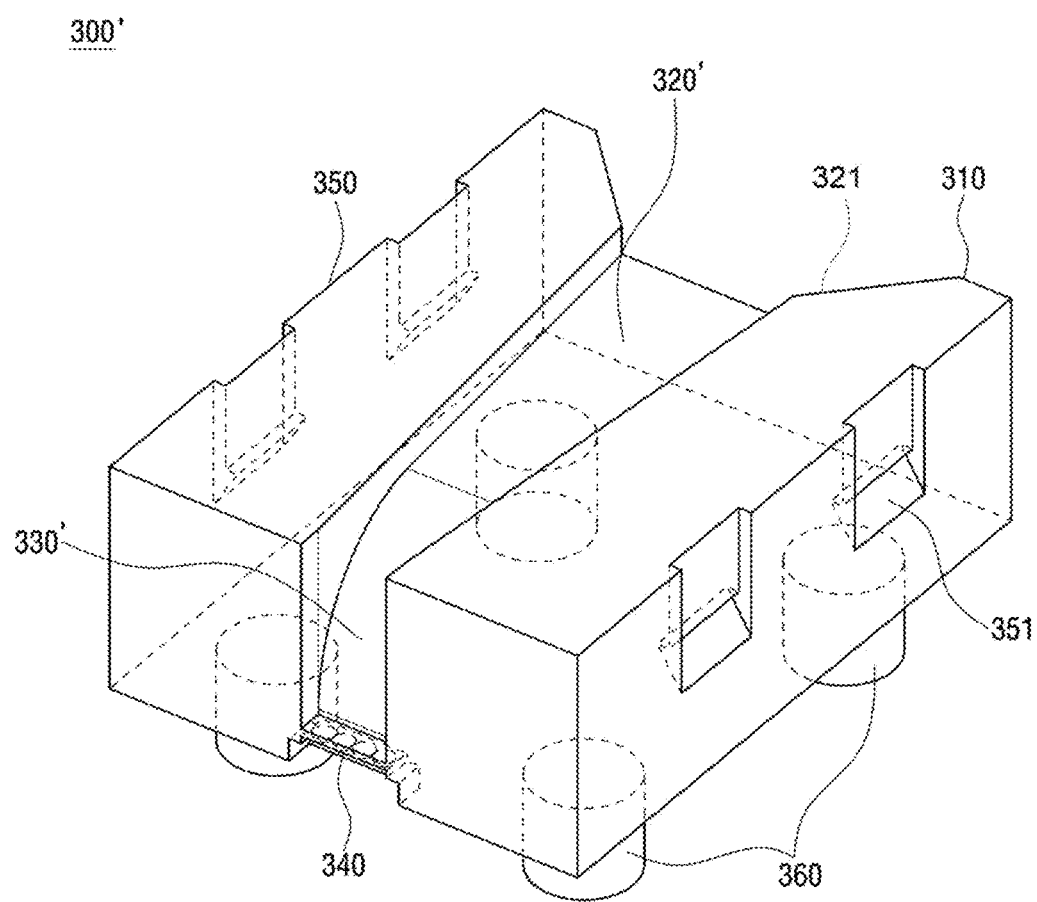
FIG. 10 is a see-through perspective view of another example of the optical bench constructed according to the principles of the disclosure.
Figure 11:
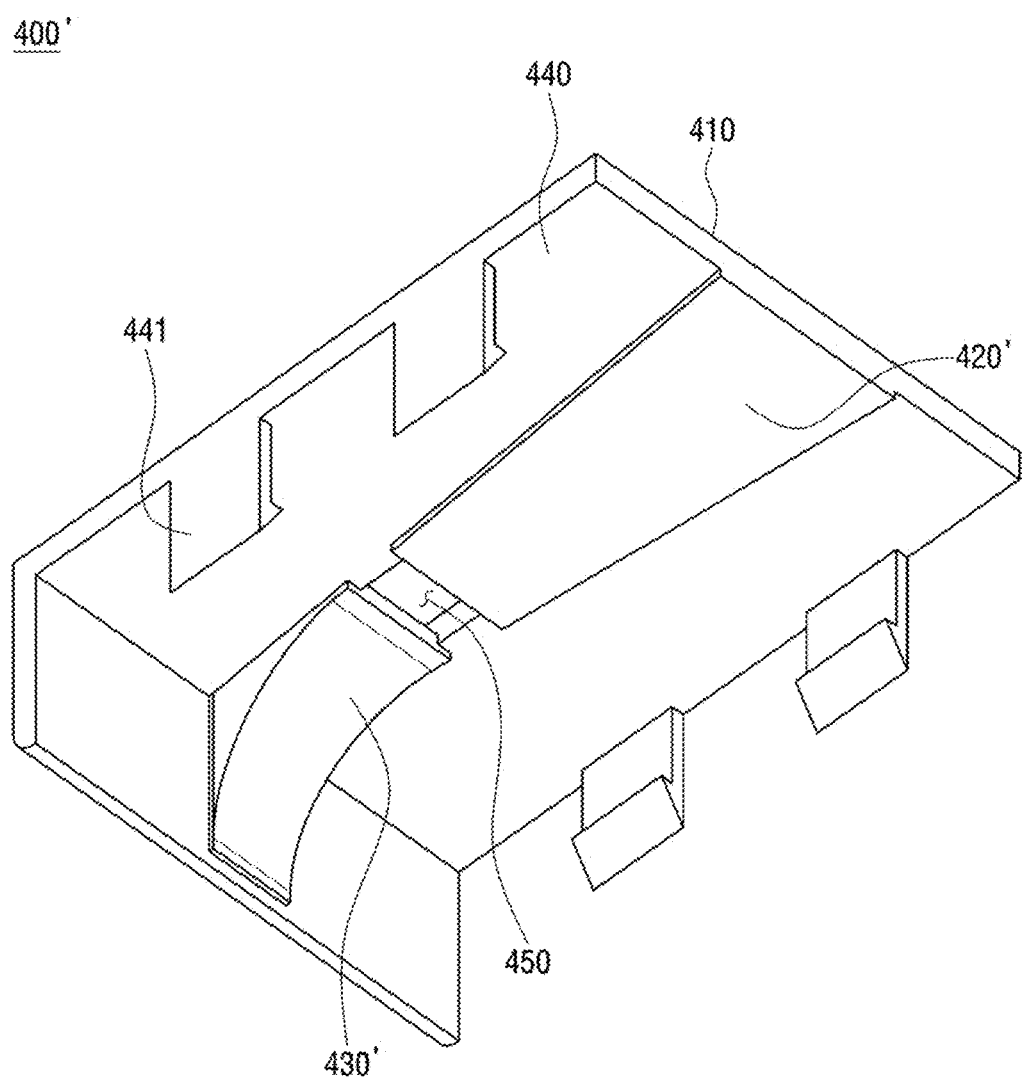
FIG. 11 is a bottom perspective view of another example of the cover constructed according to the principles of the disclosure.
Figure 12:
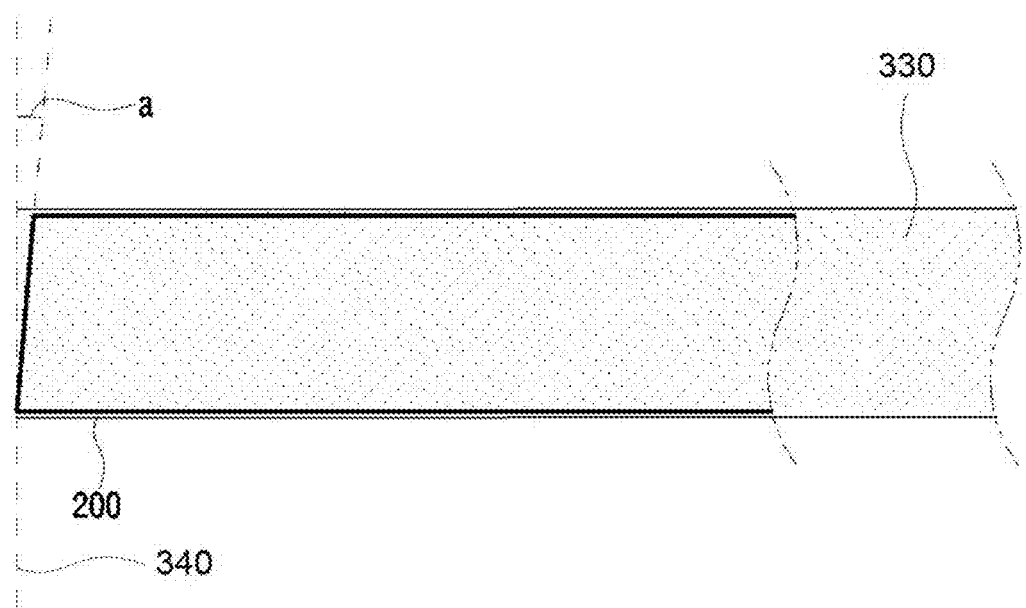
FIG. 12 is a view schematically illustrating an optical fiber having an inclined cut surface being seated on the optical bench of FIG. 1.
Figure 13:
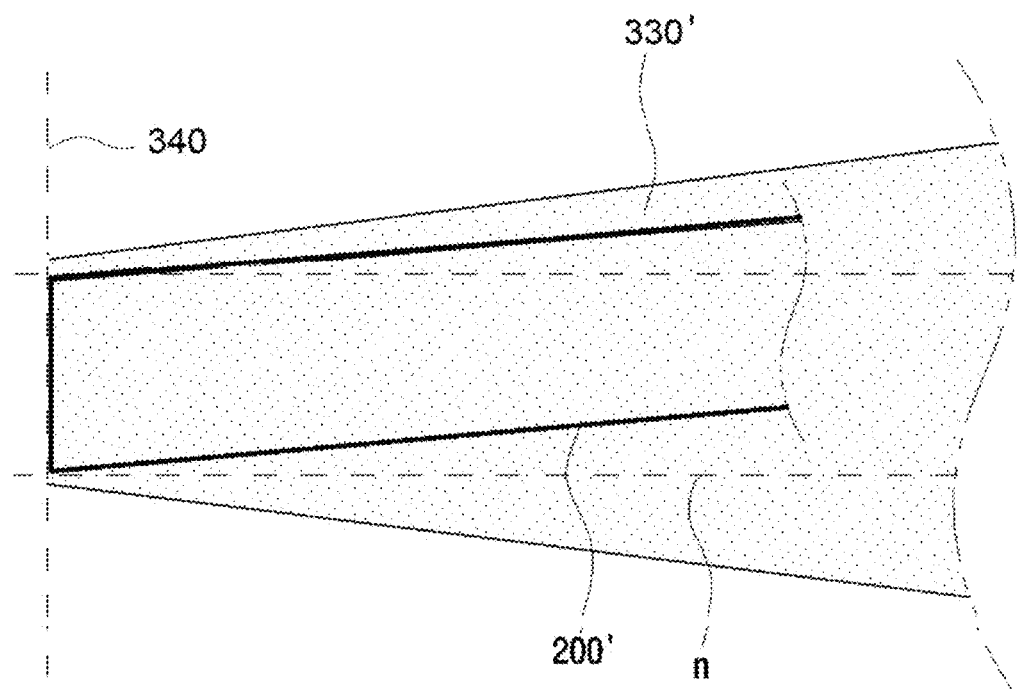
FIG. 13 is a view schematically illustrating the optical fiber having the inclined cut surface seated on the optical bench of FIG. 10.

FIG. 10 is a view of an optical bench 300', which is another example constructed according to the principles of the present disclosure. FIG. 11 is a view of a cover 400', which is also another example constructed according to the principles of the present disclosure, that is to be coupled to the optical bench 300' of FIG. 10. FIGS. 12 and 13 are views schematically illustrating optical fibers 200' that are not cut perpendicularly with respect to their lengthwise direction.

As illustrated in FIGS. 12 and 13, due to cutting characteristics of the optical fibers 200', the cut surfaces of the optical fibers 200' may not be precisely perpendicular to their lengthwise directions, and an error in the range of about 0.1° to about 5° may occur, which may tilt the cut surfaces in up and down and/or left and right directions with respect to the vertical direction.

FIG. 12 schematically illustrates a case where the cut surfaces of optical fibers 200' are cut to be inclined from an imaginary plane that is perfectly perpendicular to the lengthwise directions of the optical fibers 200'. When the first bend part 330 of the optical bench 300 is manufactured with the same width as shown in FIG. 7 in consideration of the tolerance for insertion, due to the inclined cut surfaces, the cut surfaces of the optical fibers 200' may not be in full contact with the lens unit 340 and may be inclined by an angle of a° when contacting the lens unit 340. When the cut surfaces of the optical fibers 200' are not in full contact with the lens unit 340 in a horizontal direction, a loss of light or optical crosstalk may occur.

As illustrated in FIG. 10, a seating groove 320' and a first bend part 330' of the optical bench 300' may be tapered such that a gap between the seating groove 320' and the first bend part 330' may become gradually widened from one end portion adjoining the lens unit 340 toward the other end portion into which the optical fibers 200' are inserted. As illustrated in FIG. 11, a hold part (or retainer) 420' and a second bend part 430' of the cover 400' may be constructed such that the gap between the hold part 420' and the second bend part 430' becomes gradually widened corresponding to the seating groove 320' and the first bend part 330'

Figure 14:
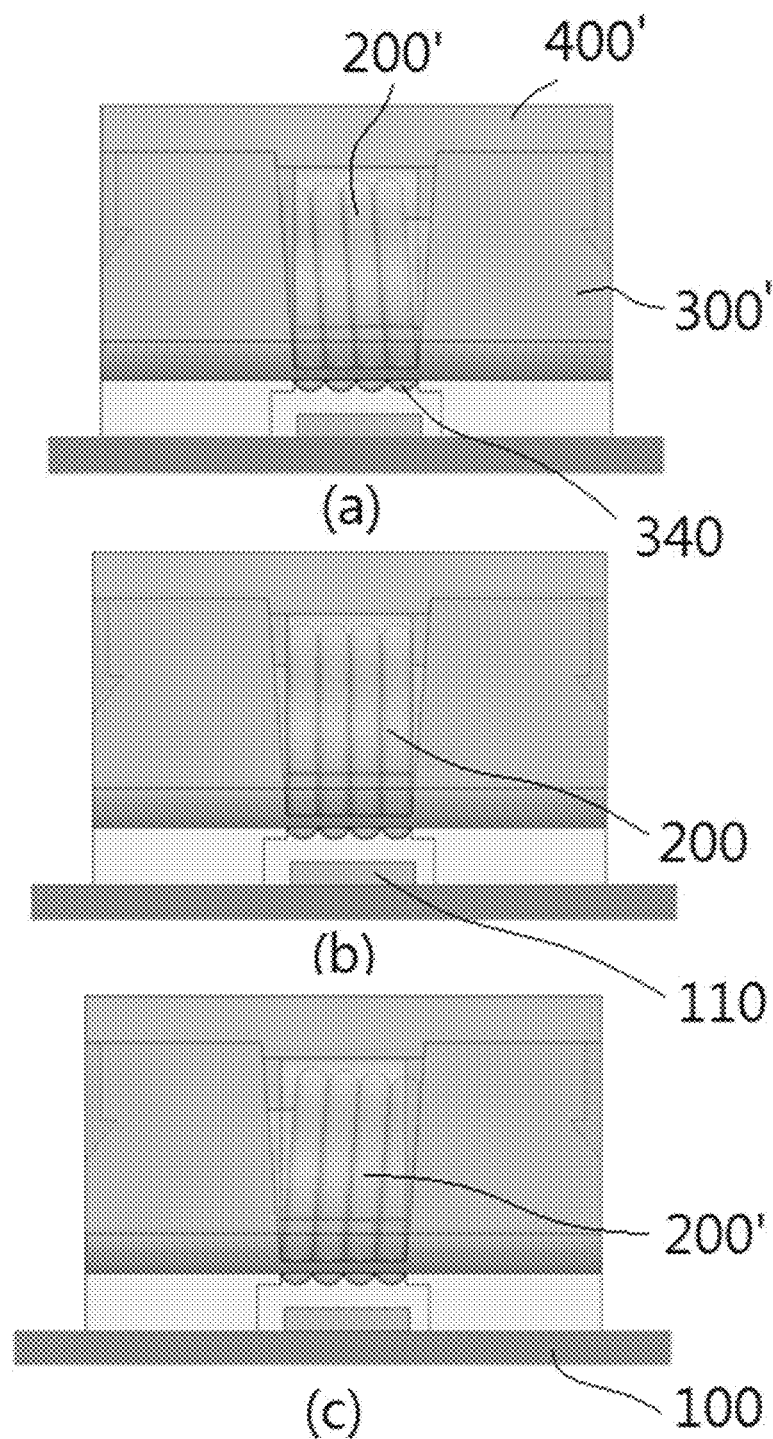
FIG. 14 is a see-through front view illustrating the optical fibers seated on an optical module.

FIG. 13 schematically illustrates the optical fibers 200' being in full contact with the lens unit 340. As illustrated, because the first bend part 330' is tapered, even when the cut surfaces of the optical fibers 200' are not perfectly perpendicular to the lengthwise direction of the optical fibers 200', the optical fibers 200' may be inclined such that the cut surfaces of the optical fibers 200 may be in full contact with the lens unit 340. Also, as shown in FIGS. 14A(a), 14(b), 14(c), even when the cut surfaces of the optical fibers 200' are inclined to the left or right, as shown in FIGS. 14(a) and 14(c), respectively, the cut surfaces may form full contact with the lens unit 340. FIG. 14(b) shows the cut surface of the optical fibers 200 being perpendicular to the lengthwise direction of the optical fibers 200'. In the process of inserting the optical fibers 200', the optical fibers 200' may be inserted, and the direction of the optical fibers 200' may be adjusted to an angle at which a maximum light efficiency is achieved using a sensor. Also, the optical fibers 200' may be held at the angle at which a maximum light efficiency is achieved, and then may be hardened and fixed by injecting an adhesive into the optical fibers 200'.

As illustrated in FIGS. 10 and 11, the seating groove 320' and the first bend part 330' of the optical bench 300' and the hold part 420' and the second bend part 430' of the cover block 400' are formed to be tapered such that the gap therebetween increases toward the insertion ports 321 from where the first bend part 330' and the second bend part 430' adjoin the lens unit 340. Thus, even when the cut surfaces of the optical fibers 200' are not cut precisely perpendicular to the lengthwise direction of the optical fibers 200', the optical fibers 200' may be inclined, and the optical fibers 200' may be in full contact with the lens unit 340. Thus, after the optical fibers 200' are cut, a process of polishing the cut surfaces of the optical fibers 200' may be omitted. This may remarkably improve the yield, thereby rendering the optical module more suitable for mass production. In addition, the loss of light or optical crosstalk that occurs when the cut surfaces of the optical fibers 200' are not in full contact with the lens unit 340 may be prevented.

As described above, the present disclosure provides an optical module and the manufacturing method thereof, which can improve an efficiency of optical coupling between the components. Also, a tolerance in the alignment process may be greatly improved, which may reduce the product defect rat. Further, an optical alignment can be simplified and a number of manufacturing steps may be reduced. Also, a thickness of an optical module can be reduced, and the structure of the optical module may be simplified, which may contribute to reducing the manufacturing cost. Furthermore, a loss of light may be reduced or removed during an optical path-changing operation.

According to the embodiments of the present disclosure, even when cut surfaces of optical fibers are not perfectly perpendicular to the lengthwise direction of the optical fibers, a seating groove may be tapered such that the cut surfaces of the optical fibers are not inclined and in full contact with the lens unit. Thus, after the optical fibers are cut, a process of polishing the cut surfaces of the optical fibers may be eliminated, and a loss of light that may be prevented.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A bending type optical module comprising:
a substrate comprising a substantially flat main surface;
one or more optical devices disposed on the main surface of the substrate;
an integrated circuit (IC) device disposed on the main surface the substrate for driving the one or more optical devices;
one or more optical fibers in optical communications with the one or more optical devices;
an optical bench that attaches to the main surface of the substrate and has a first curved surface on a top surface thereof; and
a cover that attaches to the optical bench and has a second curved surface on a bottom surface thereof,
wherein the one or more optical fibers extend curved between the first curved surface of the optical bench and the second curved surface of the cover.

2. The bending type optical module of claim 1, wherein the optical bench comprises a block shape and the cover comprises an ⌐-shape.

3. The bending type optical module of claim 1, wherein the optical bench comprises:
a seating groove, into which the one or more optical fibers are inserted and seated,
a lens unit comprising one or more lenses provided corresponding to the one or more optical fibers, respectively; and
a first bend part that extends between the seating groove and the lens unit to form the first curved surface of the optical bench.

4. The bending type optical module of claim 3, wherein the cover comprises:
a hold part formed on a bottom surface of the cover and protruding corresponding to the seating groove of the optical bench; and a second bend part extending from the hold part and curved corresponding to the first bend part to form the second curved surface,
wherein the one or more optical fibers are bent along a gap between the first curved surface and the second curved surface.

5. The bending type optical module of claim 4, wherein the cover further comprises an injection port formed through the hold part and extending to the gap between the first curved surface and the second curved surface.

6. The bending type optical module of claim 1, further comprising one or more reference marks formed on the main surface the substrate for alignment with the optical bench.

7. The bending type optical module of claim 4, wherein the hold part of the cover comprises one or more ∧-shaped or ∩-shaped grooves formed corresponding to the one or more optical fibers, respectively.

8. The bending type optical module of claim 4, wherein a radius of a curvature of the first bend part is equal to or greater than a minimum bend radius of each of the one or more of the optical fibers.

9. The bending type optical module of claim 8, wherein a radius of a curvature of the second bend part is equal to or greater than that of the first bend part.

10. The bending type optical module of claim 3, wherein the first bend part comprises a rectilinear region having a length of about 0.5 mm or more and adjoining the lens unit.

11. The bending type optical module of claim 4, wherein the second bend part comprises a rectilinear region having a length of about 0.5 mm or more and adjoining the lens unit.

12. The bending type optical module of claim 1, wherein the cover further comprises one or more hook-shaped fastening ports, and
wherein the optical bench comprises one or more fastening grooves formed to engage the one or more fastening ports.

13. The bending type optical module of claim 4, wherein the gap between the first curved surface and the second curved surface is tapered from one end portion adjoining the lens unit to the other end adjoining the seating groove of the optical bench.

14. The bending type optical module of claim 13, wherein the one or more optical fibers have cut surfaces that are tilted from a plane perpendicular to a lengthwise direction of the one or more optical fibers.

15. The bending type optical module of claim 14, wherein the cut surfaces of the optical fibers are in full contact with the one or more lenses of the lens unit, respectively.

16. A bending type optical module comprising:
a substrate;
one or more optical devices disposed on the substrate;
an integrated circuit (IC) device disposed on the substrate for driving the one or more optical devices;
one or more optical fibers in optical communications with the one or more optical devices;
an optical bench that attaches to the substrate and has a first curved surface on a top surface thereof; and
a cover that attaches to the optical bench and has a second curved surface on a bottom surface thereof,
wherein the one or more optical fibers extend curved between the first curved surface of the optical bench and the second curved surface of the cover,
wherein the optical bench comprises
a seating groove, into which the one or more optical fibers are inserted and seated, a lens unit comprising one or more lenses provided corresponding to the one or more optical fibers, respectively, and a first bend part that extends between the seating groove and the lens unit to form the first curved surface of the optical bench, and wherein the cover comprises a hold part formed on a bottom surface of the cover and protruding corresponding to the seating groove of the optical bench, and a second bend part extending from the hold part and curved corresponding to the first bend part to form the second curved surface, wherein the one or more optical fibers are bent along a gap between the first curved surface and the second curved surface.

17. The bending type optical module of claim 16, wherein the cover further comprises an injection port formed through the hold part and extending to the gap between the first curved surface and the second curved surface.

18. The bending type optical module of claim 16, wherein the hold part of the cover comprises one or more ∧-shaped or ∩-shaped grooves formed corresponding to the one or more optical fibers, respectively.

19. The bending type optical module of claim 16, wherein a radius of a curvature of the first bend part is equal to or greater than a minimum bend radius of each of the one or more of the optical fibers.

20. The bending type optical module of claim 16, wherein the second bend part comprises a rectilinear region having a length of about 0.5 mm or more and adjoining the lens unit.

* * * * *